(12) United States Patent
Lillo et al.

(10) Patent No.: US 8,357,623 B2
(45) Date of Patent: Jan. 22, 2013

(54) COMPOSITE MATERIALS AND BODIES INCLUDING SILICON CARBIDE AND TITANIUM DIBORIDE AND METHODS OF FORMING SAME

(75) Inventors: Thomas M. Lillo, Idaho Falls, ID (US); Henry S. Chu, Idaho Falls, ID (US); William M. Harrison, Hopkinsville, KY (US); Derek Bailey, Muncie, IN (US)

(73) Assignee: U.S. Department of Energy, Washington, DC (US)

( * ) Notice: Subject to any disclaimer, the term of this patent is extended or adjusted under 35 U.S.C. 154(b) by 515 days.

(21) Appl. No.: 12/414,147

(22) Filed: Mar. 30, 2009
(Under 37 CFR 1.47)

(65) Prior Publication Data
US 2010/0248930 A1    Sep. 30, 2010

(51) Int. Cl.
*C04B 35/577* (2006.01)
(52) U.S. Cl. ............. 501/92; 501/90; 501/91; 501/96.3; 264/658; 264/676
(58) Field of Classification Search .................. 501/88, 501/90, 91, 92, 96.3; 423/291, 297, 345, 423/439, 440; 264/658, 676
See application file for complete search history.

(56) References Cited

U.S. PATENT DOCUMENTS

| | | | |
|---|---|---|---|
| 2,108,794 A | 3/1935 | Boyer et al. | |
| 2,406,275 A | 8/1946 | Wejnarth | |
| 3,136,615 A | 6/1964 | Bovenkerk et al. | |
| 3,233,988 A | 2/1966 | Wentorf, Jr. et al. | |
| 3,775,137 A | 11/1973 | Clougherty et al. | |
| 3,775,138 A | 11/1973 | Clougherty et al. | |
| 3,808,012 A | 4/1974 | Bailey et al. | |
| 3,852,099 A | 12/1974 | Prochazka | |
| 3,853,566 A | 12/1974 | Prochazka | |
| 3,859,399 A | 1/1975 | Bailey et al. | |
| 3,954,483 A | 5/1976 | Prochazka | |
| 3,960,577 A | 6/1976 | Prochazka | |
| 4,067,743 A | 1/1978 | Arabei et al. | |
| 4,080,415 A | 3/1978 | Coppola et al. | |
| 4,124,401 A | 11/1978 | Lee et al. | |
| 4,124,667 A | 11/1978 | Coppola et al. | |

(Continued)

OTHER PUBLICATIONS

Lillo et al., "Ballistic Properties of Pressureless Sintered SiC/TiB2 Composites," Idaho National Engineering and Environmental Laboratory, Idaho Falls, ID, USA, Jun. 30, 2004, 1 page.

(Continued)

*Primary Examiner* — Karl Group
(74) *Attorney, Agent, or Firm* — Mark C. Lang; Michael J. Dobbs; John T. Lucas

(57) ABSTRACT

Methods of forming composite materials include coating particles of titanium dioxide with a substance including boron (e.g., boron carbide) and a substance including carbon, and reacting the titanium dioxide with the substance including boron and the substance including carbon to form titanium diboride. The methods may be used to form ceramic composite bodies and materials, such as, for example, a ceramic composite body or material including silicon carbide and titanium diboride. Such bodies and materials may be used as armor bodies and armor materials. Such methods may include forming a green body and sintering the green body to a desirable final density. Green bodies formed in accordance with such methods may include particles comprising titanium dioxide and a coating at least partially covering exterior surfaces thereof, the coating comprising a substance including boron (e.g., boron carbide) and a substance including carbon.

15 Claims, 1 Drawing Sheet

U.S. PATENT DOCUMENTS

| | | | |
|---|---|---|---|
| 4,135,938 A | 1/1979 | Murata et al. | |
| 4,151,686 A | 5/1979 | Lee et al. | |
| 4,167,399 A | 9/1979 | Lee et al. | |
| 4,174,971 A | 11/1979 | Schrewelius | |
| 4,179,299 A | 12/1979 | Coppola et al. | |
| 4,229,186 A | 10/1980 | Wilson | |
| 4,241,135 A | 12/1980 | Lee et al. | |
| 4,327,186 A | 4/1982 | Murata et al. | |
| 4,504,441 A | 3/1985 | Kuyper | |
| 4,592,882 A | 6/1986 | Parrish | |
| 4,604,106 A | 8/1986 | Hall et al. | |
| 4,705,761 A | 11/1987 | Kosugi | |
| 5,032,550 A | 7/1991 | Derkacy | |
| 5,108,965 A | 4/1992 | Tani et al. | |
| 5,212,124 A | 5/1993 | Newkirk | |
| 5,322,824 A | 6/1994 | Chia | |
| 5,384,291 A | 1/1995 | Weimer et al. | |
| 5,453,225 A | 9/1995 | Morrow et al. | |
| 5,498,855 A | 3/1996 | Deevi et al. | |
| 5,580,834 A | 12/1996 | Pfaff | |
| 5,628,945 A | 5/1997 | Riman et al. | |
| 5,656,563 A | 8/1997 | Chen et al. | |
| 5,707,567 A | 1/1998 | Pfaff | |
| 5,880,439 A | 3/1999 | Deevi et al. | |
| 5,968,653 A | 10/1999 | Coppella et al. | |
| 5,976,429 A | 11/1999 | Chen et al. | |
| 7,419,925 B1 | 9/2008 | Nunn | |
| 2008/0026929 A1 | 1/2008 | Jensen et al. | |

OTHER PUBLICATIONS

Lillo et al., "Manufacturing Methods and Ballistic Properties of Pressureless Sintered SiC/Ti B2 Composite for Lightweight Armor Applications," Idaho National Engineering and Environmental Laboratory, Idaho Falls, ID, USA, Apr. 2005, 2 pages.

Lillo et al., "Properties and Ballistic Behavior of Pressureless Sintered SiC/TiB2 Composites," Idaho National Engineering and Environmental Laboratory, Idaho Falls, ID, USA, Mar. 2005, 7 pages.

US 8,357,623 B2

COMPOSITE MATERIALS AND BODIES INCLUDING SILICON CARBIDE AND TITANIUM DIBORIDE AND METHODS OF FORMING SAME

GOVERNMENT RIGHTS

The United States Government has certain rights in this invention pursuant to Contract No. DE-AC07-051D14517 between the United States Department of Energy and Battelle Energy Alliance, LLC.

TECHNICAL FIELD

Embodiments of the present invention relate to methods of fabricating composite materials and bodies comprising silicon carbide and titanium diboride, and to materials and bodies formed by such methods.

BACKGROUND

Composite materials that include silicon carbide (SiC) and titanium diboride ($TiB_2$) are known in the art and have been used for various applications including, for example, as armor material. These materials are referred to herein as "SiC/$TiB_2$ composite materials." SiC/$TiB_2$ composite materials exhibit certain physical properties (e.g., hardness) that make them attractive for use as armor material for ballistic protection, and have a low density relative to other known armor materials such as, for example, depleted uranium and steel. As armor materials are often employed on armored vehicles, a reduction in the density and, hence, the overall weight of the armor material will improve the mobility and fuel economy of such armored vehicles.

Various methods of forming SiC/$TiB_2$ composite materials are known in the art. For example, it is known that particles of silicon carbide and particles of titanium diboride may be mixed together to form a powder mixture. The powder mixture may be used to form a green body, and the green body may be sintered to a final density to form a body comprising a SiC/$TiB_2$ ceramic composite material. The sintering process is typically conducted while applying pressure to the body being sintered (e.g., in a hot pressing process) to obtain a SiC/$TiB_2$ ceramic composite material that exhibits desirable physical properties and ballistic performance.

BRIEF SUMMARY OF THE INVENTION

In some embodiments, the present invention includes methods of forming composite materials. Particles comprising titanium dioxide may be at least partially coated with boron carbide and a carbon-containing material. The coated particles may be mixed with silicon carbide particles to form a particle mixture. A green body is formed from the particle mixture, and the green body is sintered. As the green body is sintered, the titanium dioxide may be reacted with the boron carbide and carbon from the carbon-containing material to form titanium diboride. The methods may be used to form a sintered body comprising grains of titanium diboride dispersed throughout a matrix of silicon carbide.

In additional embodiments, the present invention includes methods of forming a body that includes a discontinuous titanium diboride phase dispersed throughout a silicon carbide phase, in which methods particles comprising titanium dioxide are at least partially coated with boron carbide and a carbon source. The titanium dioxide may be reacted with the boron carbide and carbon from the carbon source to form the discontinuous titanium diboride phase of the body.

In further embodiments, the present invention includes methods of forming armor material in which particles that include titanium dioxide are at least partially coated with boron carbide and a carbon source, the coated particles are mixed with silicon carbide particles to form a particle mixture, and an armor component is formed from the particle mixture. For example, a green armor component may be formed from the particle mixture, and the green armor component may be sintered to a desirable final density to form the armor component.

In additional embodiments, the present invention includes green bodies that include silicon carbide particles and particles comprising titanium dioxide. Exterior surfaces of the particles comprising titanium dioxide may be at least partially covered with a coating comprising boron carbide and a carbon source. In some embodiments, the green bodies may comprise green armor components.

BRIEF DESCRIPTION OF THE SEVERAL VIEWS OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Figure 1:
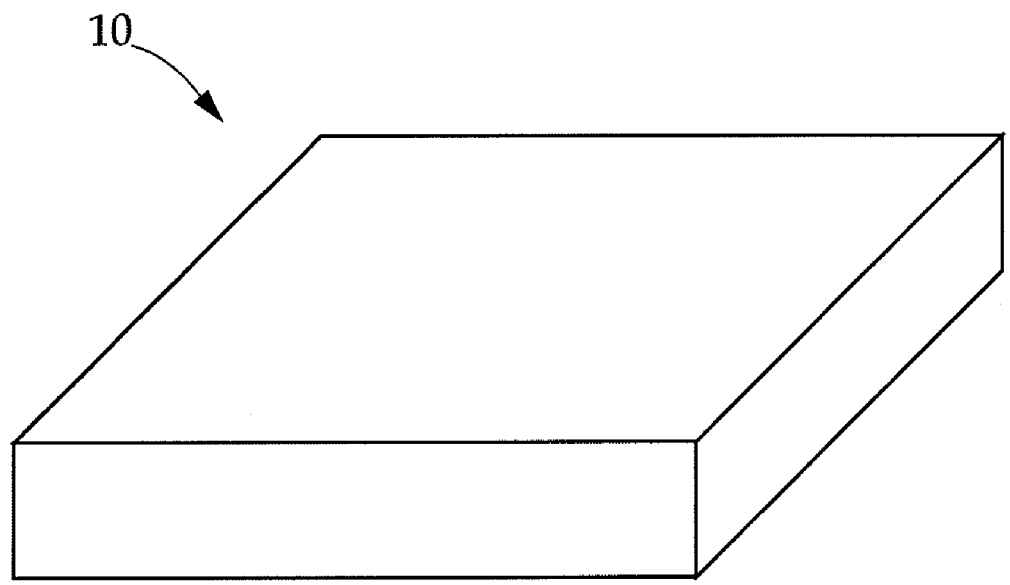
FIG. 1 is an isometric view of a green body that may be sintered to form a solid three-dimensional body comprising a SiC/$TiB_2$ composite material in accordance with embodiments of the present invention.

The illustrations presented herein are not meant to be actual views of any particular structure or device, but are merely idealized representations that are employed to describe various embodiments of the present invention.

As used herein, the term "pressureless sintering" means sintering under pressures of about five (5.0) pounds per square inch gauge (psig) or less.

As used herein, the term "low pressure sintering" means sintering under pressures of about one-thousand (1,000) pounds per square inch gauge (psig) or less. Low pressure sintering processes include pressureless sintering processes.

As used herein, the term "green body" means a less than fully sintered body. Green bodies include, for example, bodies formed from particulate matter, as well as bodies formed by partially sintering particulate matter.

As used herein, the term "fully sintered" means sintered to a desirable final density. Fully sintered bodies are bodies that have been sintered to a desirable final density, although they may comprise some level of residual porosity and, hence, may not be fully dense.

Composite bodies and materials comprising silicon carbide (SiC) and titanium diboride ($TiB_2$), which are referred to herein as "SiC/$TiB_2$ composite materials," may be manufactured using silicon carbide powder and a powder comprising titanium dioxide ($TiO_2$). The powder comprising titanium dioxide may include, for example, titanium dioxide particles or oxidized titanium diboride particles, as discussed in further detail below. During sintering processes used to form the SiC/TiB$_2$ composite materials, the titanium dioxide may be reacted with other materials to convert the titanium dioxide to titanium diboride. For example, the titanium dioxide may be reacted with boron carbide (B$_4$C) and carbon (C) in a carbothermal reduction reaction. Furthermore, the particles of the powder comprising titanium dioxide may be at least partially coated with one or more of the materials used to convert the titanium dioxide to titanium diboride, as discussed in further detail below.

Embodiments of three-dimensional bodies of the present invention that include a SiC/TiB$_2$ composite material may be fabricated by preparing a powder mixture, forming a green body from the powder mixture, and sintering the green body to a desirable final density.

A powder mixture may be prepared that includes silicon carbide particles (e.g., silicon carbide powder) and particles comprising titanium dioxide.

Silicon carbide may exhibit different crystal structures. For example, silicon carbide that exhibits a hexagonal crystal structure is referred to as alpha silicon carbide (α-SiC), and silicon carbide that exhibits a zinc blende crystal structure is referred to as beta silicon carbide (β-SiC). In some embodiments, the silicon carbide particles may comprise alpha silicon carbide. In additional embodiments, the silicon carbide particles may comprise beta silicon carbide.

The silicon carbide particles may comprise, for example, a grade of silicon carbide material such as, for example, HSC 490DP silicon carbide powder sold by Superior Graphite Co. of Chicago, Ill., which is a directly pressable and pressureless-sinterable alpha silicon carbide powder. By way of example and not limitation, the silicon carbide particles of the powder mixture may have an average particle size (e.g., an average diameter) that is about two-hundred and fifty microns (250 μm) or less. More particularly, the silicon carbide particles may have an average particle size of about seventy-five microns (75 μm) or less, or even about ten microns (10 μm) or less.

The particles comprising titanium dioxide may comprise, for example, titanium dioxide particles (i.e., particles that are at least substantially comprised of titanium dioxide) or oxidized titanium diboride particles.

A non-limiting example of a powder that includes particles comprising titanium dioxide and that may be employed in embodiments of the present invention is titanium oxide powder T-1156 sold by Cerac, Inc. of Milwaukee, Wis.

Oxidized titanium diboride particles are titanium diboride particles that have been at least partially oxidized. Unless handled under virtually oxygen-free environments, titanium diboride particles comprise at least a thin layer of titanium oxide on the surface thereof. As a result, oxidized titanium diboride particles may have an inner core comprising titanium diboride and an outer shell of titanium dioxide that surrounds the inner core of titanium diboride. The thickness of the outer shell of titanium dioxide depends on the degree to which the titanium diboride particles have been oxidized. Furthermore, as the particle size decreases, the fraction of titanium dioxide to titanium diboride in the particle increases.

By way of example and not limitation, the particles comprising titanium dioxide in the powder mixture may have an average particle size (e.g., an average diameter) that is about two-hundred and fifty microns (250 μm) or less. More particularly, the particles comprising titanium dioxide may have an average particle size of about seventy-five microns (75 μm) or less, or even about ten microns (10 μm) or less.

At temperatures greater than about 1100° C., titanium dioxide reacts with boron carbide and carbon to form titanium diboride and carbon monoxide in accordance with Equation 1 below:

$$2TiO_2 + B_4C + 3C \rightarrow 2TiB_2 + 4CO \qquad \text{Equation 1:}$$

Therefore, in some embodiments of the present invention, the powder mixture may include boron carbide and carbon or a carbon-containing material, both of which may be referred to generally herein as a "carbon source," in addition to the silicon carbide particles and the particles comprising titanium dioxide. The molar ratio of titanium dioxide (TiO$_2$) to boron carbide (B$_4$C) in the particle mixture may be between about one (1) and about two (2.0). More particularly, the molar ratio of titanium dioxide (TiO$_2$) to boron carbide (B$_4$C) in the particle mixture may be about 5:3. The molar ratio of titanium dioxide (TiO$_2$) to carbon of the carbon source in the particle mixture may be between about 1:1 and about 2:3.

As previously mentioned, the particles comprising titanium dioxide may be at least partially coated with one or more materials used to convert the titanium dioxide to titanium diboride in a reaction occurring during a sintering process. For example, the particles comprising titanium dioxide may be at least partially coated with one or more of boron carbide and carbon (or a carbon source).

As an example, the particles comprising titanium dioxide may be at least partially coated with both boron carbide and a carbon source by mixing the particles comprising titanium dioxide, boron carbide particles, and a carbon source in a liquid solvent to form a slurry.

By way of example and not limitation, the boron carbide particles may have an average particle size (e.g., an average diameter) that is less than the average particle size of the particles comprising titanium dioxide. For example, the boron carbide particles may have an average particle size that is about fifty percent (50%) or less of the average particle size of the particles comprising titanium dioxide, or even about twenty-five percent (25%) or less of the average particle size of the particles comprising titanium dioxide. As a non-limiting example, the particles comprising titanium dioxide may have an average particle size of about seventy-five microns (75 μm) or less, and the boron carbide particles may have an average particle size of about ten microns (10 μm) or less. Such boron carbide particles are commercially available from, for example, Cerac, Inc. of Milwaukee, Wis.

The amount of titanium dioxide in or on the particles comprising titanium dioxide added to the slurry may be determined, and the quantity of boron carbide added to the slurry may be selected such that the molar ratio of titanium dioxide to boron carbide in the slurry is between about one (1) and about two (2.0), and more particularly, about one and six tenths (1.6).

The carbon source may comprise, for example, a phenolic polymer material such as a phenolic resin. An example of a phenolic resin that may be employed in embodiments of the present invention is sold under the trade name Durez 29353 by Durez Corporation of Detroit, Mich. In other embodiments, carbon powder (i.e., graphite or carbon black), another polymeric material, an organic material, or another carbon-containing material may be used as the carbon source.

The amount of titanium dioxide on the particles comprising titanium dioxide added to the slurry may be determined, and the quantity of carbon added to the slurry may be selected such that the molar ratio of titanium dioxide to carbon in the slurry is between about 1:1 and about 2:3.

The liquid solvent used to form the slurry may comprise a liquid in which the carbon source may at least partially dissolve. The slurry also may include one or more additives such as, for example, wetting agents and dispersing agents to facilitate the suspension of the particles comprising titanium dioxide and the boron carbide particles in the liquid solvent. By way of example and not limitation, the liquid solvent may comprise water or acetone when phenolic resin is used as the carbon source.

After forming the slurry, the slurry may be agitated until it is at least substantially homogenous, after which the slurry may be allowed to dry. As the slurry dries, the liquid solvent may be removed (e.g., evaporated), leaving behind particles comprising titanium dioxide that are at least partially coated with boron carbide material and the carbon source.

After coating the particles comprising titanium dioxide, the coated particles optionally may be subjected to a crushing process to reduce the average particle size of the coated particles. By way of example, the coated particles comprising titanium dioxide may be crushed until the coated particles have an average particle size of about two-hundred and fifty microns (250 µm) or less.

Optionally, the coated particles comprising titanium dioxide may be subjected to a thermal treatment process to convert the carbon source into at least substantially pure carbon. For example, if phenolic resin is used as the carbon source, the coated particles comprising titanium dioxide may be heated in an inert atmosphere (e.g., argon) to a temperature between about 600° C. and about 900° C. for about three hours to convert the phenolic resin to carbon.

Optionally, the coated particles may be subjected to a crushing process or an additional crushing process after thermally treating the coated particles to reduce the average particle size of the coated and treated particles. By way of example, the coated and thermally treated particles comprising titanium dioxide may be crushed until they have an average particle size of about seventy five microns (75 µm) or less. The silicon carbide particles and the coated particles comprising titanium dioxide may be mixed together to form the powder mixture. Dry mixing or wet mixing processes may be used to mix together the silicon carbide particles and the particles comprising titanium dioxide.

In some embodiments, the powder mixture may comprise two or more different modes of particle sizes. In other words, the particles of the powder mixture may exhibit a multi-modal particle size distribution (e.g., a bi-modal, tri-modal, etc., particle size distribution). As a non-limiting example, the powder mixture may comprise a first group of particles having a first average particle size, a second group of particles having a second average particle size about seven (7) times greater than the first average particle size, and a third group of particles having an average particle size about thirty-five (35) times greater than the first average particle size. Each group may comprise both silicon carbide particles and particles comprising titanium dioxide, or one or more of the groups may be at least substantially comprised of either silicon carbide particles or particles comprising titanium dioxide particles. By forming the powder mixture to have a multi-modal particle size distribution, it may be possible to increase the packing density of the powder mixture in a green body formed from the powder mixture.

Referring to FIG. 1, after forming the powder mixture, the powder mixture may be formed into a three dimensional green body 10. The green body 10 shown in FIG. 1 has the shape of a rectangular prism, although green bodies formed in accordance with embodiments of the present invention may have any simple or complex three-dimensional shape, which will be at least partly determined by the desired shape of the ultimate fully sintered three-dimensional $SiC/TiB_2$ composite body to be formed from the green body 10.

Various shape-forming processes are known in the art and may be used to form a green body 10 from the powder mixture. For example, pressing processes may be used to form a green body 10 from the powder mixture. Pressing processes include, for example, uniaxial pressing processes and isostatic pressing processes. Casting processes also may be used to form a green body 10 from the powder mixture. Casting processes include, for example, slip casting processes and tape casting processes. In slip casting, the powder mixture may be suspended in a liquid medium to form a liquid suspension, and the liquid suspension then may be cast in a mold or die to form the green body. Plastic forming processes also may be used to form a green body 10 from the powder mixture. Plastic forming processes involve producing shapes from a mixture of powder and polymeric additives that together form a paste-like material that then may be shaped into a green body by, for example, extrusion processes and molding processes (e.g., injection molding and compression molding).

In additional embodiments of the present invention, the powder mixture may be suspended in a fluid medium such as, for example, isopropanol or water to form a liquid suspension, and a casting process then may be used to form the green body 10 in a mold or die directly from the liquid suspension (without drying the liquid suspension prior to the casting process).

Figure 2:
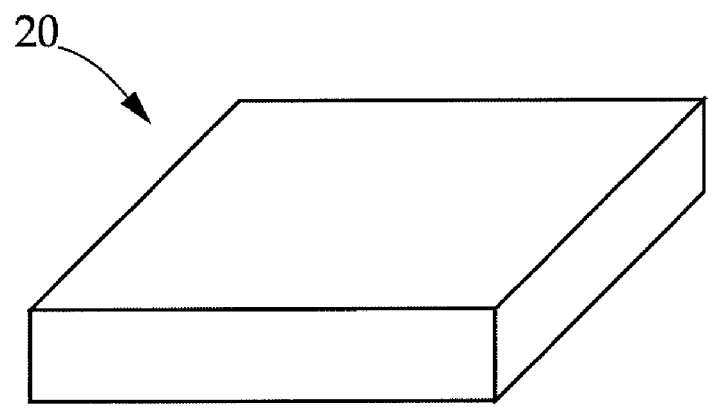
FIG. 2 is an isometric view of a solid three-dimensional body of SiC/$TiB_2$ composite material that may formed by sintering the green body shown in FIG. 1 in accordance with embodiments of the present invention.

After forming a green body 10, the green body 10 may be sintered to a desired final density to form a fully sintered three-dimensional solid body 20 of $SiC/TiB_2$ composite material, as shown in FIG. 2. Upon sintering, the green body 10 will undergo densification and, hence, shrinkage. As a result, the fully sintered three-dimensional solid body 20 of $SiC/TiB_2$ composite material may be smaller than the green body 10.

Prior to sintering, the green body 10 may be subjected to a thermal treatment to remove any organic additives present in the green body 10, and/or to promote cross-linking or polymerization of any polymeric carbon source in the powder mixture (which may impart strength to the green body 10 to facilitate handling and/or machining of the green body 10 if necessary or desirable). By way of example and not limitation, the green body 10 may be heated in air to a temperature of between about two-hundred degrees Celsius (200° C.) and about three-hundred degrees Celsius (300° C.), more particularly about two-hundred and forty-two degrees Celsius (242° C.), and the temperature may be held between about eight hours or more.

Sintering may be conducted within a furnace in an inert atmosphere (e.g., argon). Furthermore, the sintering may comprise a low pressure or a pressureless sintering process. For example, the green body 10 may be sintered at a pressure of about one-thousand (1,000) pounds per square inch gauge (psig) or less, or even at a pressure of about five (5.0) pounds per square inch gauge (psig) or less.

As a non-limiting example of a method that may be used to sinter a green body 10, the temperature within a sintering furnace in which the green body 10 is disposed may be increased at a rate of about ten degrees Celsius (10° C.) per minute to between about two-thousand degrees Celsius (2,000° C.) and about two-thousand and two-hundred degrees Celsius (2,200° C.). The temperature within the furnace then may be held at the sintering temperature for between about five (5) minutes and about sixty (60) minutes, after which the temperature within the furnace may be decreased at a rate of about ten degrees Celsius (10° C.) per minute to about room temperature.

Embodiments of the present invention may facilitate the production of relatively dense ceramic composite materials and bodies of silicon carbide and titanium diboride using low-pressure or pressureless sintering techniques that exhibit improved ballistic performance relative to previously known composite materials and bodies of silicon carbide and titanium diboride formed using pressure-assisted densification methods such as hot-pressing. As embodiments of the present invention may be fabricated without pressure-assisted densification methods, embodiments of the present invention may facilitate the production of ceramic composite materials and bodies of silicon carbide and titanium diboride having relatively complex geometries that exhibit improved physical properties relative to previously known materials and bodies of silicon carbide and titanium diboride having comparable complex geometries.

Although embodiments of the present invention may be used to provide armor materials and bodies, embodiments of the present invention may be used to fabricate any composite material or body comprising silicon carbide and titanium diboride, and is not limited to the fabrication of armor components.

While the invention is susceptible to various modifications and implementation in alternative forms, specific embodiments have been shown by way of non-limiting example in the drawings and have been described in detail herein. However, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A method of forming a composite material, comprising the following steps in the sequence set forth:
   (1) at least partially coating particles comprising titanium dioxide ($TiO_2$) with boron carbide ($B_4C$) and a carbon source to form coated particles;
   (2) mixing the coated particles with silicon carbide (SiC) particles to form a particle mixture;
   (3) forming a green body from the particle mixture; and
   (4) sintering the green body, comprising:
      (a) reacting the titanium dioxide ($TiO_2$) with the boron carbide ($B_4C$) and carbon of the carbon source to form titanium diboride ($TiB_2$); and
      (b) forming a sintered body comprising grains of titanium diboride ($TiB_2$) dispersed substantially throughout a matrix comprising silicon carbide (SiC).

2. The method of claim 1, wherein at least partially coating particles comprising titanium dioxide ($TiO_2$) comprises at least partially coating titanium dioxide ($TiO_2$) particles.

3. The method of claim 1, wherein at least partially coating particles comprising titanium dioxide ($TiO_2$) comprises at least partially coating oxidized titanium diboride ($TiB_2$) particles.

4. The method of claim 1, where step (1) comprises at least partially coating particles comprising titanium dioxide ($TiO_2$) with a polymeric material.

5. The method of claim 4, therein at least partially coating particles comprising titanium dioxide ($TiO_2$) with the polymeric material comprises at least partially coating particles comprising titanium dioxide ($TiO_2$) pith a phenolic polymer material.

6. The method of claim 4, wherein step (1) comprises: (a) mixing titanium dioxide ($TiO_2$) particles, boron carbide ($B_4C$) particles, the polymeric material, and a solvent to form a slurry; and, (b) drying the slurry to form the coated particles.

7. The method of claim 6, further comprising the step of thermally treating the partially coated particles to convert the carbon source into substantially pure carbon.

8. The method of claim 7, wherein the thermal treatment comprises heating the partially coated particles at a temperature between about 600° C. and about 900° C.

9. The method of claim 7, further comprising the step of crushing the partially coated and treated particles to reduce the average particle size.

10. The method of claim 1, further comprising providing a molar ratio of titanium dioxide ($TiO_2$) to boron carbide ($B_4C$) in the particle mixture of between about 1:1 and about 2:1.

11. The method of claim 10, further comprising providing a molar ratio of titanium dioxide ($TiO_2$) to boron carbide ($B_4C$) in the particle mixture of about 5:3.

12. The method of claim 10, further comprising providing a molar ratio of titanium dioxide ($TiO_2$) to carbon of the carbon source in the particle mixture of between about 1:1 and about 2:3.

13. A method of forming an armor component, the method comprising the following steps in the sequence set forth:
   (1) at least partially coating particles comprising titanium dioxide ($TiO_2$) with boron carbide ($B_4C$) and a carbon source to form coated particles;
   (2) mixing the coated particles with silicon carbide (SiC) particles to form a particle mixture;
   (3) forming a green armor component from the particle mixture;
   (4) sintering the green armor component to form an at least substantially fully sintered armor component, sintering the green armor component comprising reacting the titanium dioxide ($TiO_2$) with the boron carbide ($B_4C$) and the carbon to form titanium diboride ($TiB_2$).

14. The method of claim 13, wherein step (1) comprises:
   (a) mixing titanium dioxide ($TiO_2$) particles, boron carbide ($B_4C$) particles, the carbon source, and a liquid solvent to form a slurry; and
   (b) drying the slurry to form the coated particles.

15. The method of claim 14, wherein sintering the green armor component comprises heating the green armor component in a furnace to a temperature of about 2000° C. or more at a pressure of about five (5.0) pounds per square inch gauge (psig) or less.

* * * * *